United States Patent [19]
Nagaoka et al.

[11] Patent Number: 5,434,936
[45] Date of Patent: Jul. 18, 1995

[54] MECHANICAL OPTICAL SWITCH

[75] Inventors: Shinji Nagaoka; Yukiya Funanami; Nobuo Suzuki; Akira Tsuchiya; Seiichi Tanuma; Tomohiro Yoshikawa; Hideo Majima, all of Tokyo, Japan

[73] Assignees: Seiko Instruments Inc.; Nippon Telegraph & Telephone Corporation, both of Japan

[21] Appl. No.: 306,468

[22] Filed: Sep. 15, 1994

[30] Foreign Application Priority Data

Sep. 17, 1993 [JP] Japan .................. 5-231420

[51] Int. Cl.⁶ .................................................. G02B 6/26
[52] U.S. Cl. .................................... 385/22; 385/21
[58] Field of Search ................. 385/16, 20, 21, 22, 385/23, 25; 74/502.4, 502.6

[56] References Cited

U.S. PATENT DOCUMENTS 5,261,015 11/1993 Glasheen .................. 385/23

FOREIGN PATENT DOCUMENTS 58-7601  7/1981  Japan .................. 385/20
57-6805  1/1982  Japan .................. 385/22
57-20702 2/1982  Japan .................. 385/22

Primary Examiner—Rodney B. Bovernick
Assistant Examiner—John Ngo
Attorney, Agent, or Firm—Adams & Wilks

[57] ABSTRACT

A first pair of optical fibers are held and fixed to a supporting member in a cantilever form, and oppositely connected to a second pair of the optical fibers that are fixed to a square hole of the alignment material. A magnetic body is adhered to each of the first pair of optical fibers. Around the magnetic bodies, there are aligned hollow solenoid coils, and one pair or two pairs of permanent magnets respectively are oppositely aligned so as to have opposite polarities to each other.

4 Claims, 16 Drawing Sheets

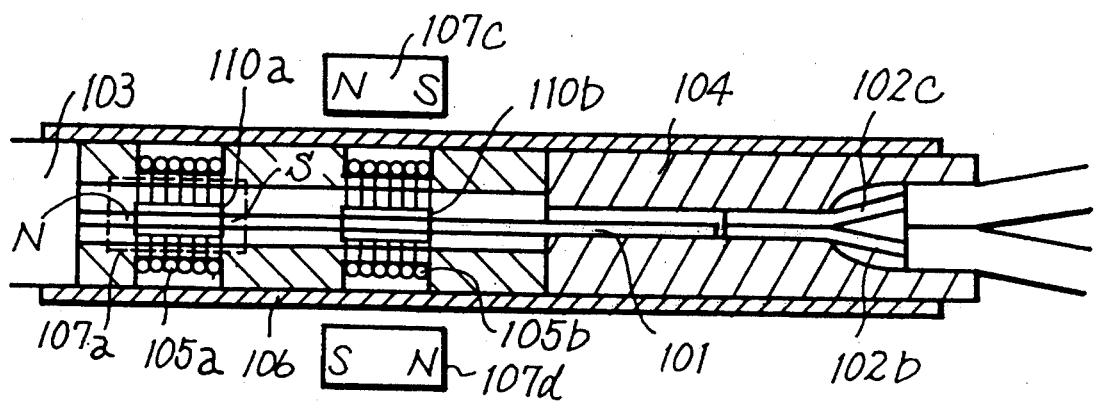
F I G. 1
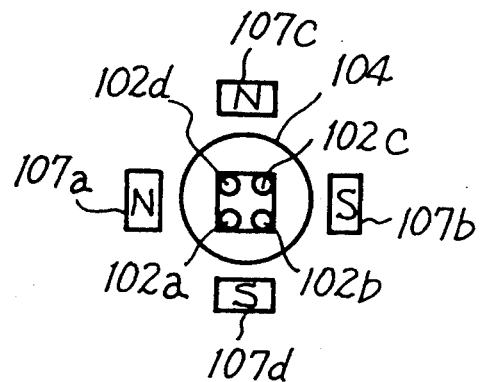
F I G. 2
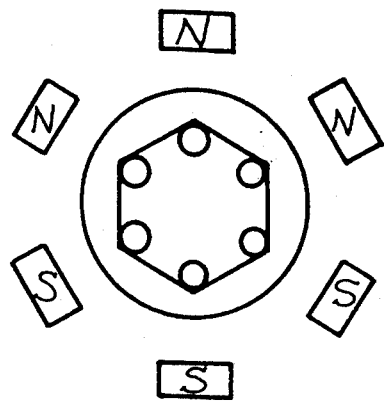
F I G. 3

MECHANICAL OPTICAL SWITCH

BACKGROUND OF THE INVENTION

The present invention relates to a mechanical optical switch of optical fiber direct driving type which is applied to optical communication and so forth.

A mechanical optical switch having a structure that an optical path is switched by directly driving an optical fiber is characterized by the simple structure, a little insertion loss, miniaturization, and low driving electric power. Switch structures of various types have been proposed in the past. FIG. 4 is a sectional view showing a conventional optical switch of optical fiber direct driving type. The conventional optical switch is composed of: a movable optical fiber 301 whose core line is fixed to a cylindrical tube 303 in a cantilever form, a magnetic body 310 having a desired magnetic characteristic and adhered to a surface of the movable optical fiber 301 in a vicinity of a tip thereof, a hollow solenoid coil 305 for inverting magnetic poles of both ends of the magnetic body 310; a pair of permanent magnets 307 which apply magnetic attraction to the magnetic body 310 in a direction vertical to an optical axis; two fixed optical fibers 302a, 302b fixed to a square hole formed within a columnar member 304; and a cylindrical sleeve 306 which aligns and holds the cylindrical tube 303 and the columnar member 304, and on which the solenoid coil 305 and the permanent magnets 307 are fixed respectively.

This switch operates as follows. The movable optical fiber 301 is magnetically attracted to one of the pair of permanent magnets 307 according to the magnetic poles of both the ends of the magnetic body 310. The tip of the movable optical fiber 301 optically combines with one of the two fixed optical fibers 302a and 302b in a corner of the square hole formed within the columnar member 304. The solenoid coil 305 is energized and a magnetic field along the optical axis is applied to the magnetic body 310 to invert the magnetic poles of the magnetic body 310. Then, the movable optical fiber 301 is attracted toward the other permanent magnet, thereby optically combining the other fixed optical fiber. Even when a current is not supplied, the magnetic body 310 can remain combined with one of the fixed optical fibers 302a and 302b because the magnetic body 310 is magnetically attracted to the permanent magnet 307, thereby obtaining a switching operation of latching type. Such a structure is disclosed in, for example, the Japanese Patent Publication No. Sho 64-11925.

However, the conventional mechanical optical switch of optical fiber direct driving type has one port on an input-side and two ports on an output-side (1×2 optical switch), which has the following problem. A plurality of 1×2 optical switches are necessary to form a 1×N mechanical optical switch (hereinafter referred to as "1×N optical switch") and a 2×2 mechanical optical switch (hereinafter referred to as "2×2 optical switch") respectively. For instance, in order to form a 1×4 optical switch and a 1×8 optical switch, generally three and seven 1×2 optical switches are connected in a branch-off structure as shown in FIG. 5(a) and 5(b) respectively. In order to form a 2×2 optical switch, it is necessary to connect four 1×2 optical switches in a branch-off and cross structure as shown in FIG. 5(c). Therefore, an object of the present invention is to solve the conventional problem mentioned above and to provide a compact 1×N optical switch and a compact 2×2 optical switch with a little loss by a simple element structure.

SUMMARY OF THE INVENTION

The present invention provides a 1×N optical switch with a little loss by composing the optical switch of:

1) a movable optical fiber whose core line is fixed in a cantilever form, a plurality of magnetic bodies discontinuously adhered in a vicinity of a tip of the movable optical fiber in a lengthwise direction;
2) a plurality of fixed optical fibers which are fixed in a plurality of concaves respectively so that one of tips thereof and the tip of the movable optical fiber are opposite to each other;
3) a plurality of solenoid coils provided so as to surround the plurality of magnetic bodies; and
4) a plurality of permanent magnets which are arranged at an equivalent angle respectively on a surface of a coaxial cylinder having the movable optical fiber as a center, a pair of the permanent magnets that are arranged in opposite to each other through the solenoid coil along an extended direction of each of the magnetic bodies and have opposite polarities to each other being considered as a basic element.

Further, the present invention provides a compact 2×2 optical switch with a little loss by being composed of:

1) two movable optical fibers whose core lines are fixed in a cantilever form, which have magnetic bodies respectively fixed in a vicinity of tips of the movable optical fibers themselves, and which are arranged in parallel with each other;
2) two fixed optical fibers which are fixed in a square hole provided within a columnar member so that tips of the movable optical fibers and tips of themselves are opposite to each other;
3) two hollow solenoid coils provided for inverting magnetic poles of the two magnetic bodies separately;
4) two pairs of permanent magnets for applying magnetic attraction to the respective magnetic bodies in a direction vertical to an optical axis and for moving separately the two movable optical fibers in opposite directions in an arc respectively.

In the 1×N optical switch with the above structure, the plurality of magnetic bodies are attracted or repelled by the pair of permanent magnets corresponding to the permanent bodies, and then the tip of the one movable optical fiber moves within the plurality of concaves and becomes opposite to the desired fixed optical fiber. Further, in the 2×2 optical switch, the two magnetic bodies are attracted or repelled by the permanent magnets corresponding to the magnetic bodies, and then the tips of the two movable optical fibers become opposite to the two desired fixed optical fibers that are fixed in the square hole.

BRIEF EXPLANATION OF THE DRAWINGS

FIG. 1 is a sectional view showing a structure of the 1×4 optical switch according to the invention.

FIG. 2 is a perspective view of the 1×4 optical switch according to the present invention.

FIG. 3 is a perspective view of the 1×6 optical switch according to the present invention.

DETAILED DESCRIPTION OF THE INVENTION

Figure 4:
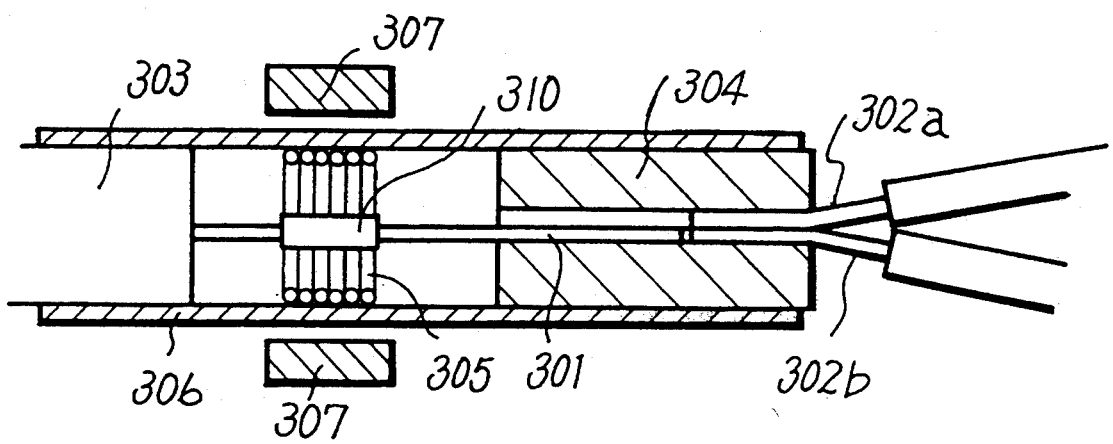
FIG. 4 is a sectional view of the conventional 1×2 optical switch.
Figure 5A:
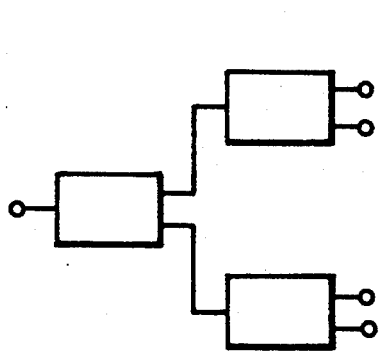
FIG. 5(a), (b) and (c) are basic structural views of the 1×N optical switches and the 2×2 optical switch in which a plurality of the conventional 1×2 optical switches of optical direct driving type are connected.
Figure 5B:
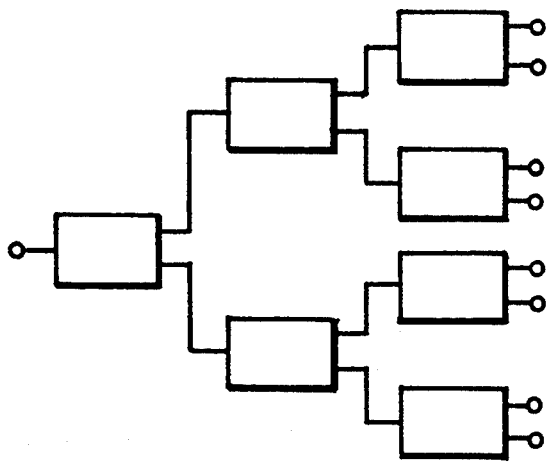
Figure 5C:
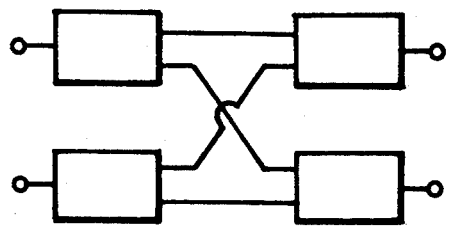

Hereinafter, embodiments of the present invention will be explained referring to drawings. FIG. 1 is a sectional view showing a 1×4 optical switch, one of the embodiments of the present invention. FIG. 2 is a perspective view showing how magnets and fixed optical fibers that are shown in FIG. 1 are arranged in a circumferential direction. A movable optical fiber 101 is provided, which is fixed to a tip of a cylindrical sleeve 106 in a cantilever form by a cylindrical tube 103, and which has two magnetic bodies 110a and 110b in a pipe shape made of a soft-magnetic material such as an Fe—Ni alloy. Solenoid coils 105a and 105b are provided so as to surround the magnetic bodies 110a and 110b. Further, a pair of permanent magnets 107a and 107b are aligned in parallel with the magnetic body 110a and at equivalent intervals, oppositely to each other through the solenoid coil 105a so as to have opposite magnetic directions to each other; and a pair of permanent magnets 107c and 107d are aligned in parallel with the magnetic body 110b and at equivalent intervals, oppositely to each other through the solenoid coil 105b so as to have opposite magnetic directions to each other. Moreover, there are provided four fixed optical fibers 102a, 102b, 102c and 102d, one of whose tips is opposite to a tip of the movable optical fiber 101, and which are fixed in a corner of a square hole within a columnar member 104 fixed within the cylindrical sleeve 106.

Next, operation of the switch will be explained. There will be given an explanation on a case that the tip of the movable optical fiber 101 being opposite to the fixed optical fiber 102a in FIG. 2 is switched so as to be opposite to the fixed optical fiber 102c. In order to make the tip of the movable optical fiber 101 opposite to the fixed optical fiber 102c, the magnetic body 110a is moved in a three-dimensional direction in FIG. 1 (rightward in FIG. 2), and the magnetic body 110b is moved upward in FIG. 1.

In order to move the magnetic body 110b upward in FIG. 1, a pulse current flows through the solenoid coil 105b so that a side of the magnetic body 110b corresponding to an S pole of the upper permanent magnet 107c (a right side in FIG. 1) become an N pole. Then, the magnetic body 110b is polarized, repels the permanent magnet 107d and is attracted by the permanent magnet 107c, thereby moving upward. The magnetic body 110a can also be moved to a predetermined position by the similar operation to that for the magnetic body 110b.

As mentioned above, the movable optical fiber 101 optically combines with one of the fixed optical fibers by combining polarizing directions of the magnetic bodies 110a and 110b. Even when a current is not supplied, because the magnetic bodies 110a and 100b are magnetically attracted by either the permanent magnets 107a or 107b, and 107c or 107d respectively, the movable optical fiber 101 can remain combining with one of the four fixed optical fibers, thereby obtaining a switching operation of lacking type.

FIG. 3 is a perspective view showing an alignment relationship in a circumferential direction between the fixed optical fiber and the permanent magnets in case of forming a 1×6 optical switch. This can be realized by providing three pairs of permanent magnets and aligning a fixed optical fiber at each of corners in an equilateral hexagonal hole. By aligning fixed optical fibers in such a positional relation, a desired 1×N optical switch can be formed.

Figure 6:
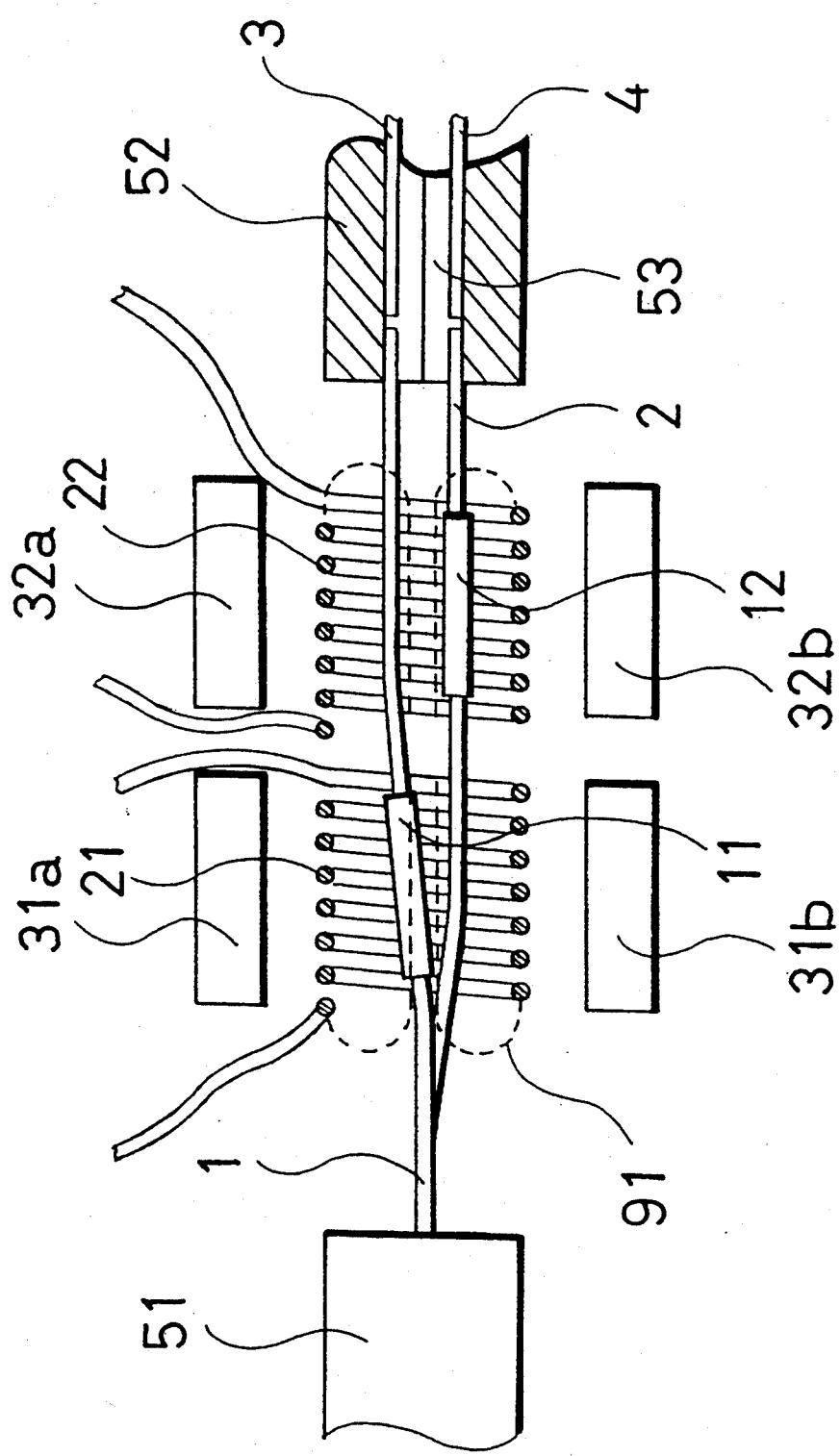
FIG. 6 is an explanatory view showing arrangement and operation of main elements in the first embodiment of typical structures of the inventive 2×2 optical switch.
Figure 7:
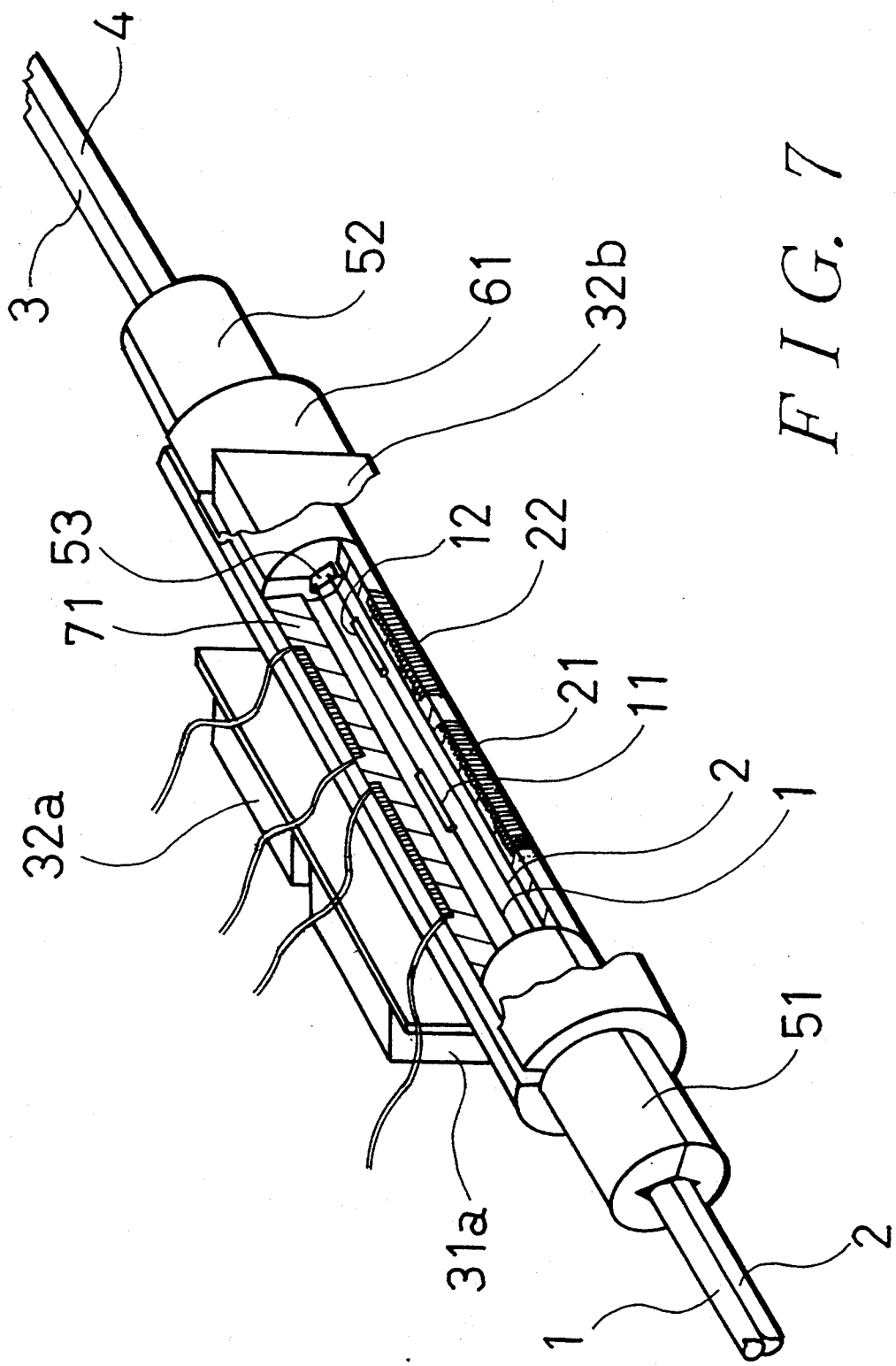
FIG. 7 is a perspective sectional view showing the first embodiment of the inventive 2×2 optical switch.
Figure 8:
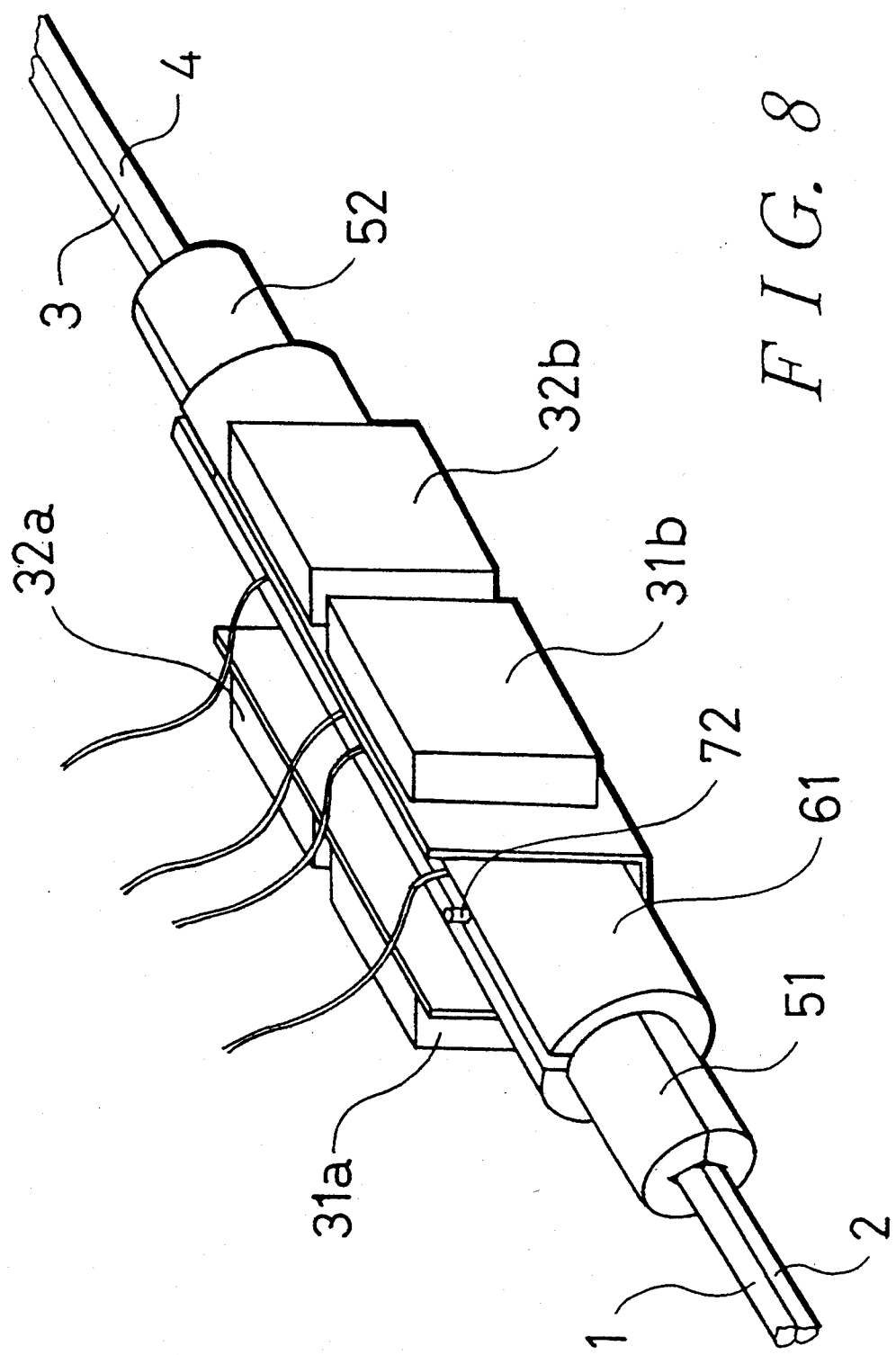
FIG. 8 is a perspective appearance view showing the first embodiment of the inventive 2×2 optical switch.

Next, embodiments of a 2×2 optical switch according to the present invention will be explained referring to drawings. All of the Embodiments 1 to 3 disclose 2×2 optical switches, each of which has an input/output port including a first optical fiber 1 and a second optical fiber 2 as one pair and an input/output port including a third optical fiber 3 and a fourth optical fiber 4 as one pair. The first optical fiber 1 connects with either the third optical fiber 3 or the fourth optical fiber 4, and the second optical fiber 2 connects with one of the third optical fiber 3 and the fourth optical fiber 4 that does not connect with the first optical fiber 1. FIGS. 6, 7, and 8 show the first embodiment of the present invention.

The first embodiment is composed of the following elements: a supporting member 51 to which face portions of the first optical fiber 1 and the second optical fiber 2 that have magnetic bodies 11 and 12 adhered thereto respectively, are fixed in a cantilever form; hollow solenoid coil 21 and 22 provided for inverting magnetic poles of both ends of the magnetic bodies 11 and 12 respectively; two pairs of permanent magnets 31a and 31b, and 32a and 32b for applying magnetic attraction to the magnetic bodies 11 and 12; and a cylindrical sleeve 61 for aligning and holding an aligning member 52, the third and the fourth optical fiber 3 and 4 are fixed in a square hole in a center thereof, and for fixing each of the three elements.

The first and the second optical fiber 1 and 2 are movable fibers and are held in a center of the supporting member 51 in parallel with each other and in a cantilever form. Further, the desired magnetic bodies 11 and 12 are adhered respectively in the vicinity of the tips of the first and the second optical fiber 1 and 2 and in different positions so that the two magnetic bodies 11 and 12 are not overlapped in respective lengthwise directions of the optical fibers 1 and 2. In order words, the magnetic body 11 is within a magnetic field of the pair of permanent magnets 31a and 31b, and the magnetic body 12 is within a magnetic field of the other pair of permanent magnets 32a and 32b.

The hollow solenoid coils 21 and 22 are arranged so as to surround the magnetic bodies 11 and 12 respectively, and the both coils are wound in the same direction. In this state, if a driving current flows to both terminals of the hollow solenoid coil 21 and a driving current of an opposite direction flows to both terminals of the hollow solenoid coil 22, the two magnetic bodies 11 and 12 are magnetized in opposite directions to each other. The pairs of permanent magnets 31a and 31b, and 32a and 32b are aligned so that magnetic poles of both pairs are approximately in parallel with the optical fibers 1 and 2; so that magnetic lines of force generated between the permanent magnets 31a and 31b, and 32a and 32b respectively are approximately in parallel with a plane including portions of the third and the fourth optical fibers 3 and 4 which are fixed to the aligning member 52; and so that the permanent magnets 31a and 31b are opposite to each other and the permanent magnets 32a and 32b are opposite to each other while the oppositely aligned poles have opposite polarities respectively. Further, the permanent magnets 31a and 32a have the same magnetic direction and the permanent magnets 31b and 32b have the same magnetic direction. The third and the fourth optical fiber 3 and 4 are fixed fibers, which are inserted into a square hole 53 bared in a center of the aligning member 52 in the same direction, and fixed along respectively two interior angles of the square hole that are opposite angle to each other. A pair of tips of the first and the second optical fiber 1 and 2 inserted in a direction opposite to that for the third and the fourth fiber 3 and 4 are aligned in opposite with the pair of tips of the third and the fourth optical fiber 3 and 4 at predetermined intervals along the interior angles of the square hole 53. Further, the supporting member 51 is aligned so that a plane including a portion of the first and the second optical fiber 1 and 2 that is fixed to the supporting member 51 is vertical to the plane including the fixed portions of the third and the fourth optical fiber 3 and 4.

Moreover, the hollow solenoid coil 21 and 22 are wound around a core material 71. Further, the supporting member 51 and the alignment member 52 are pressed against the core material 71 and fixed thereto, thereby fixing with a predetermined space left the pair of tips of the first and the second optical fiber 1 and 2 and the pair of tips of the third and the fourth optical fiber 3 and 4 which are previously fixed in predetermined lengths.

Next, operation of the switch will be explained. The two adjacent pairs of permanent magnets 31a and 31b, and 32a and 32b are aligned so that the permanent magnets 31a and 31b have the same magnetic directions with the permanent magnetic 32a and 32b respectively. In this state, if a driving current flows to both terminals of the hollow solenoid coil 21 and a driving current of an opposite direction flows to both terminals of the hollow solenoid coil 22, the two magnetic bodies 11 and 12 are magnetized in opposite directions to each other. For instance, the first optical fiber 1 is attracted toward the permanent magnet 31a while the second optical fiber 2 is attracted toward the permanent magnet 32b. In such a manner, the pair of movable optical fibers 1 and 2 usually move to opposite directions to each other. The first and the second optical fiber 1 and 2 which are attracted by the permanent magnets in opposite directions to each other are pressed against an interior surface of the square hole 53 provided in the alignment material 52, are stable along the interior angles of the square hole 53. Further, each of the fibers 1 and 2 oppositely connects with either of the third and the fourth optical fiber 3 and 4 with a predetermined gap. Further, if directions of driving currents flowing through the hollow solenoid coils 21 and 22 are changed respectively, directions of magnetic fields generated from the hollow solenoid coils 21 and 22 invert respectively and the magnetic bodies 11 and 12 are magnetized in opposite directions respectively, whose polarities invert respectively. Due to the above, the first and the second optical fiber 1 and 2 are attracted toward the permanent magnets on opposite sides respectively and, each of them connects with one of the optical fibers 3 and 4 that has not been connected with it. A driving current flows through the hollow solenoid coils 21 and 22 only when an optical path is switched. A latching state can be maintained by operation that the two magnetic bodies 11 and 12 which are magnetized when driving currents flow are attracted toward the permanent magnets 31a, 31b, 32a and 32b respectively. It goes without saying that directions in which the hollow solenoid coil 21 and 22 are wound, directions of driving current which flow to both terminals and, polarities of the pairs of permanent magnets 31a and 31b, and 32a and 32b are not limited to those in this embodiment.

Figure 9:
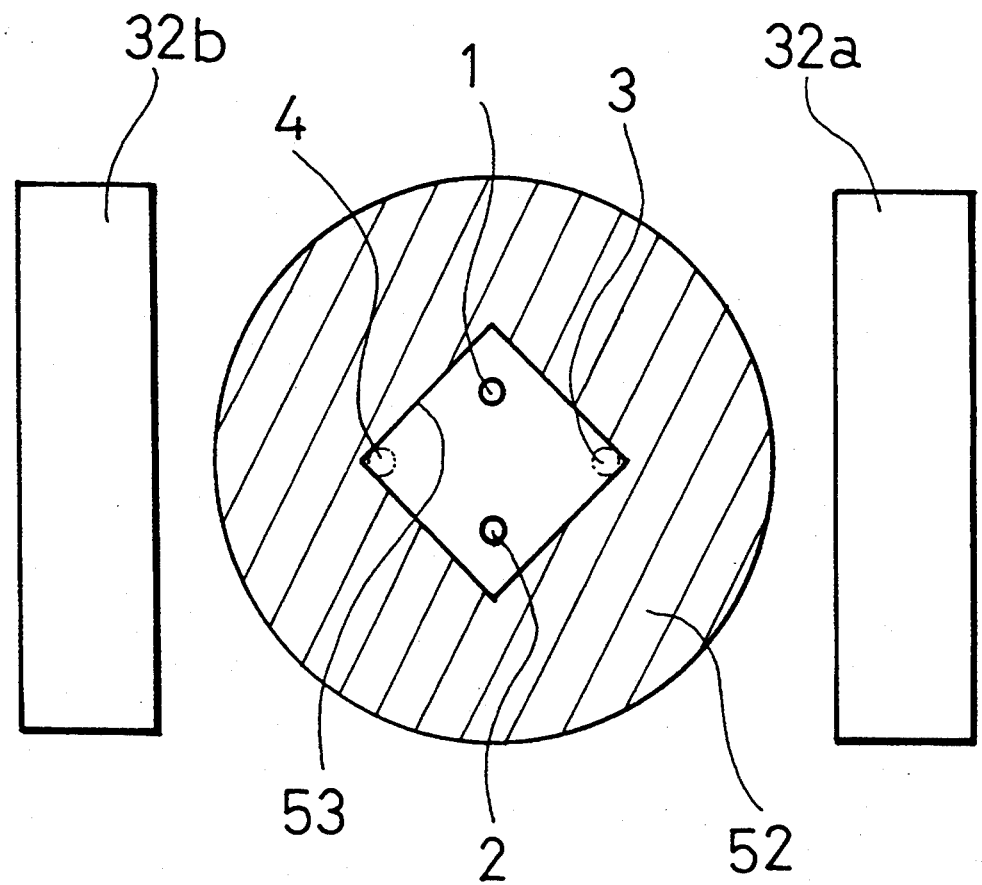
FIG. 9 is a sectional view showing an arrangement relation of fixing portions of the first, the second, the third and the fourth optical fiber in FIG. 7.

FIG. 9 is a sectional view showing the alignment member 52 that is cut vertically to a lengthwise direction at an opposite connecting portion of the first and the second optical fiber 1 and 2, and the third and the fourth optical fiber 3 and 4 in a state that a magnetic field is not applied in FIG. 7.

Figures 10A, 10B:
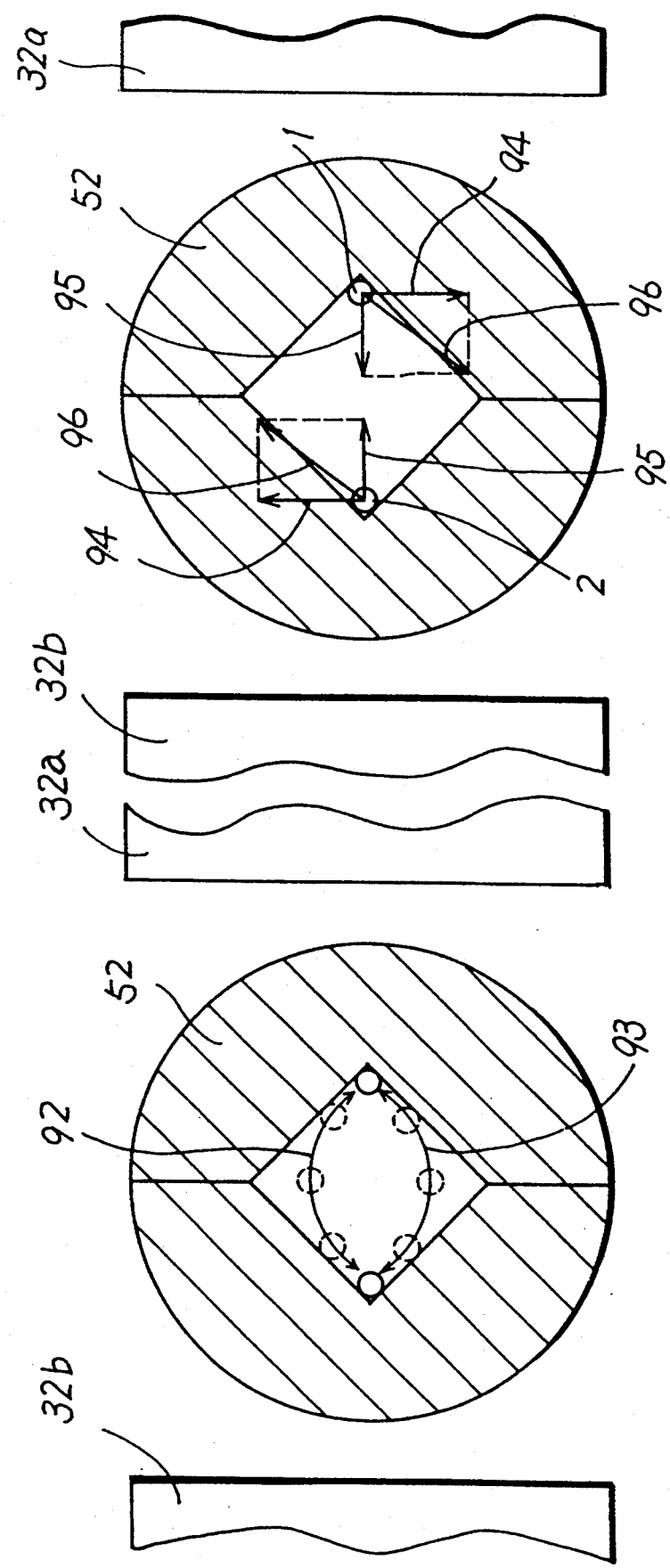
FIG. 10(a), (b) are sectional views of the alignment member seen from the sides of the third and the fourth optical fiber respectively for explaining the operation to switch between the first and the second optical fiber.
Figure 11:
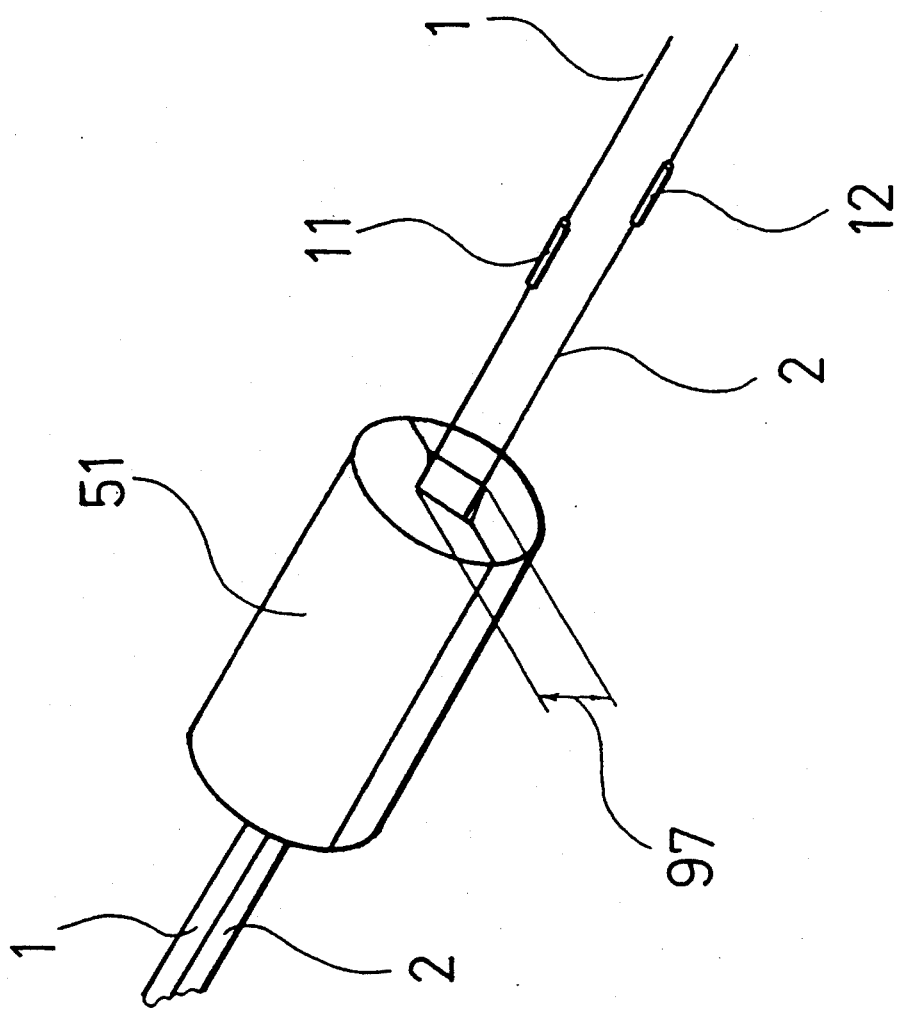
FIG. 11 is a perspective view showing an embodiment of the supporting member in the 2×2 optical switch according to the present invention.

FIG. 10(a) shows the alignment member 52 and the square hole 53 seen at the same cutting plane as that in FIG. 9 from a side of the third and the fourth optical fiber 3 and 4, lines 92 and 93 represent loci of the first and the second optical fiber 1 and 2 which move during switching operation respectively. The base portions of the first and the second optical fiber 1 and 2 are secured to the supporting member a space 97 as shown in FIG. 11. The space 97 is required to be larger than an outside diameter of the magnetic bodies 11 and 12. Therefore, a force 94 for maintaining the space always acts on the first and the second optical fiber 1 and 2 as shown in FIG. 10(b). During the switching operation, the first and the second optical fiber 1 and 2 tend to move in a direction of a resultant force 96 of the force 94 and a force 95 attracted by the permanent magnets 32a and 32b. This tendency prevents the first and the second optical fiber 1 and 2 from colliding with each other and entwining with each other even during the switching operation. Further, FIG. 10(b) shows a state that the switching operation begins from a state that the first and the third optical fiber 1 and 3 are oppositely connected and the second and the fourth optical fiber 2 and 4 are the same.

Figure 12:
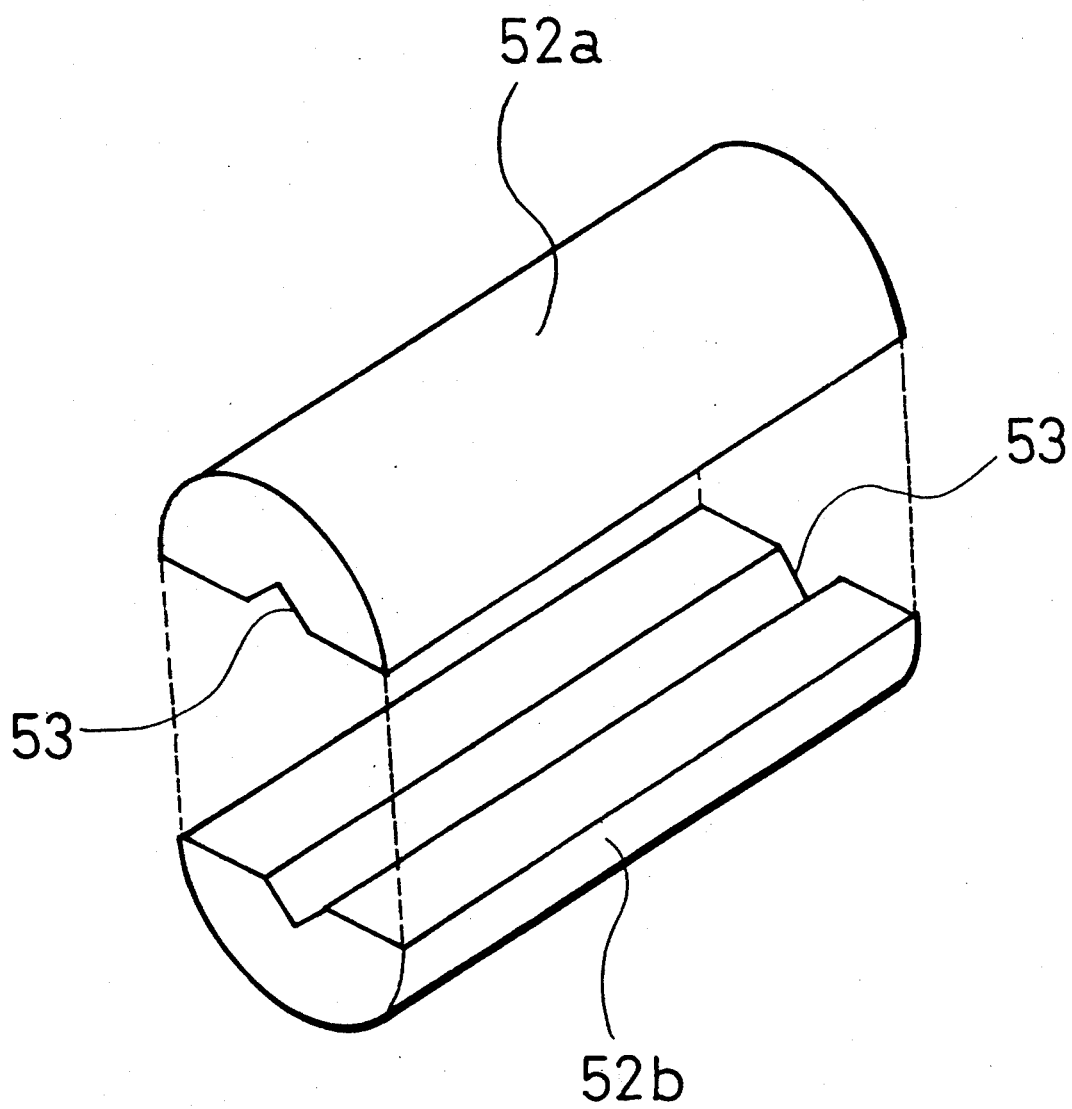
FIG. 12 is a perspective view showing an embodiment of the alignment member in the 2×2 optical switch according to the present invention.

FIG. 12 is an example of the alignment member 52. As shown in FIG. 12, a V-shaped groove with a base angle of 90° is made in the center of each of plane portions of semicolumnar members 52a and 52b. When the plane portions of the two semicolumnar members 52a and 52b are combined according to the outside diameter, an accurate square hole 53 is formed and it becomes easier to fix the optical fibers.

Figure 13:
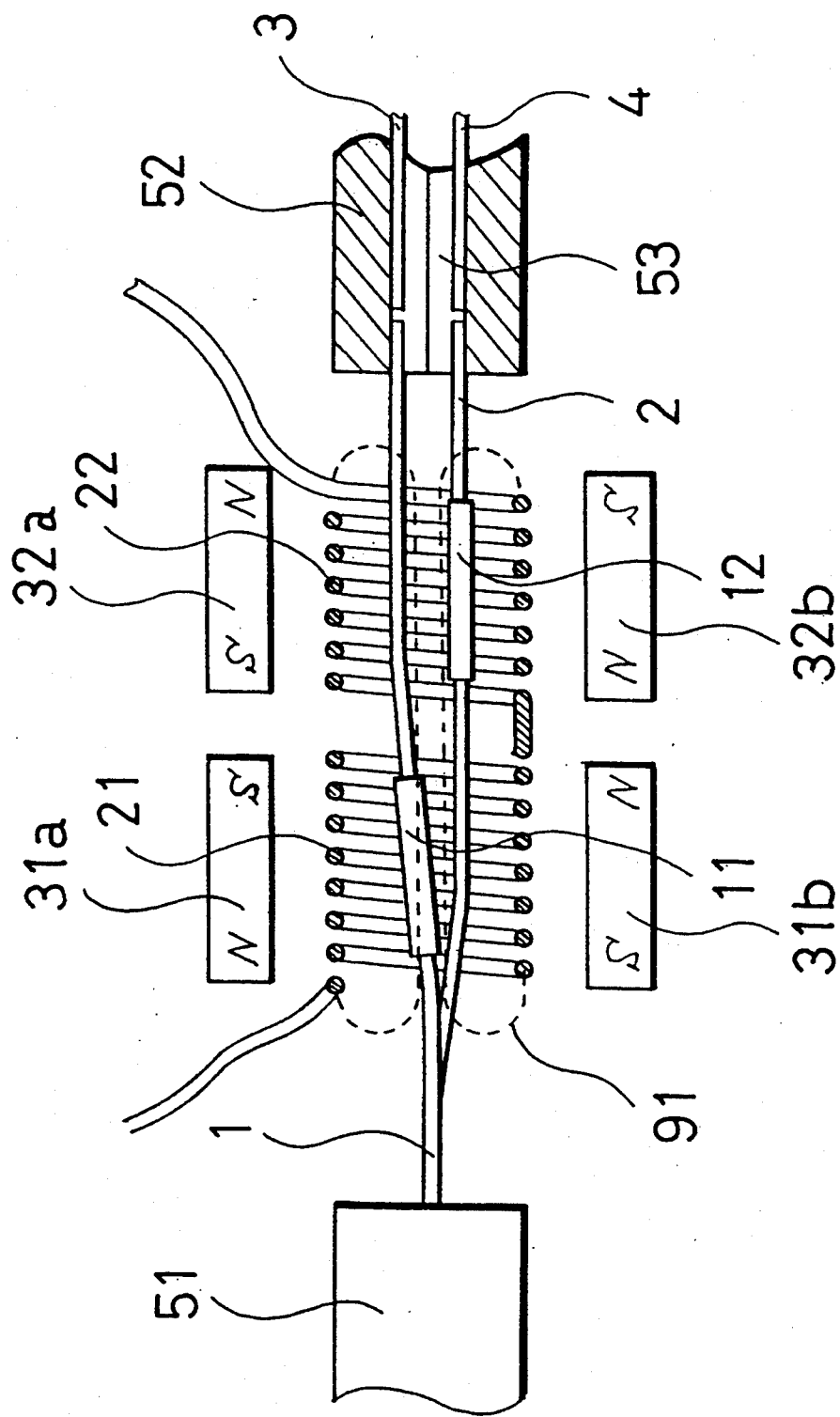
FIG. 13 is an explanatory view showing arrangement and function of chief elements in the second example of typical structures of the 2×2 optical switch according to the present invention.
Figure 14:
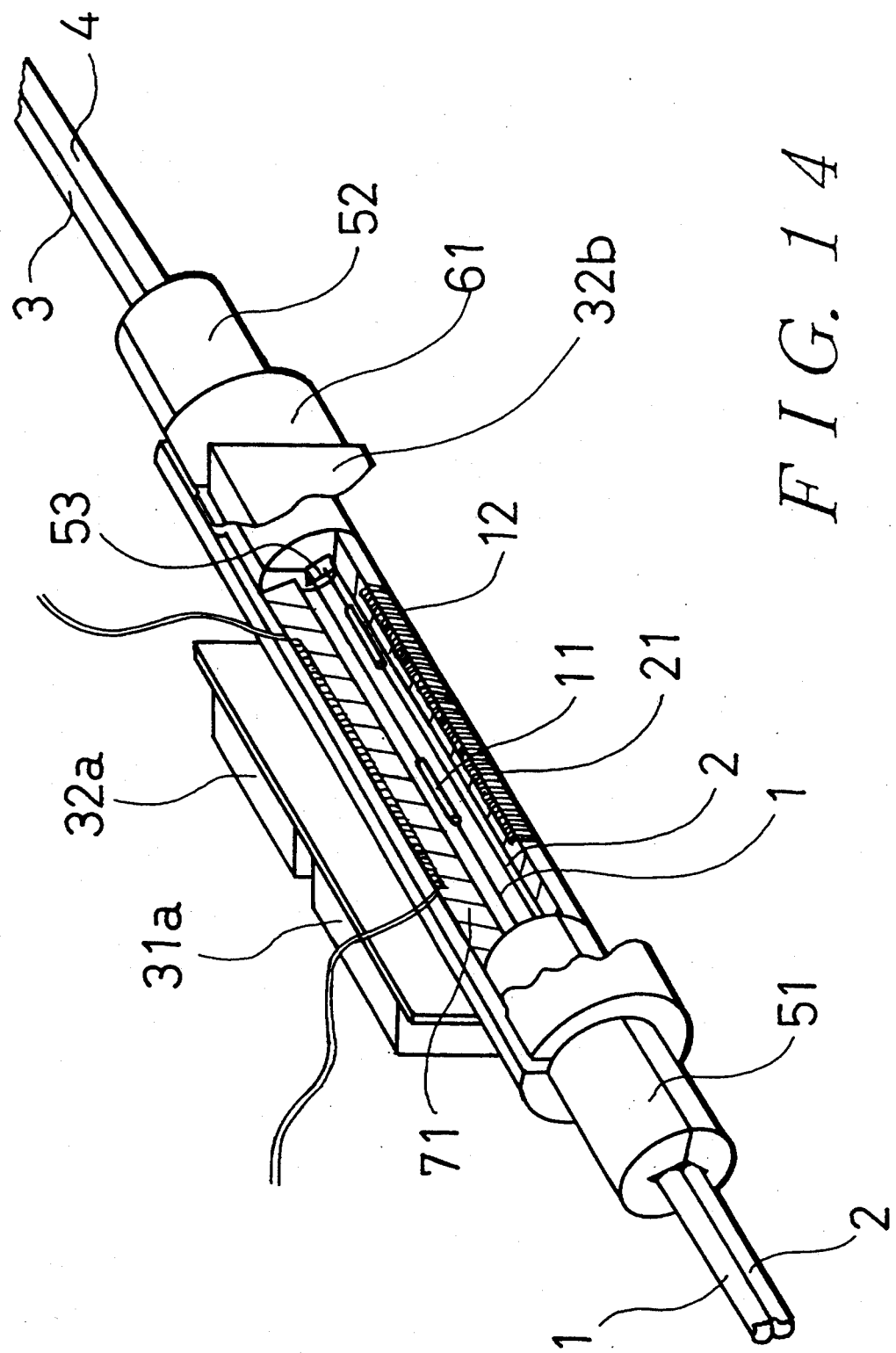
FIG. 14 is a perspective sectional view showing the second embodiment of the 2×2 optical switch of the present invention.
Figure 15:
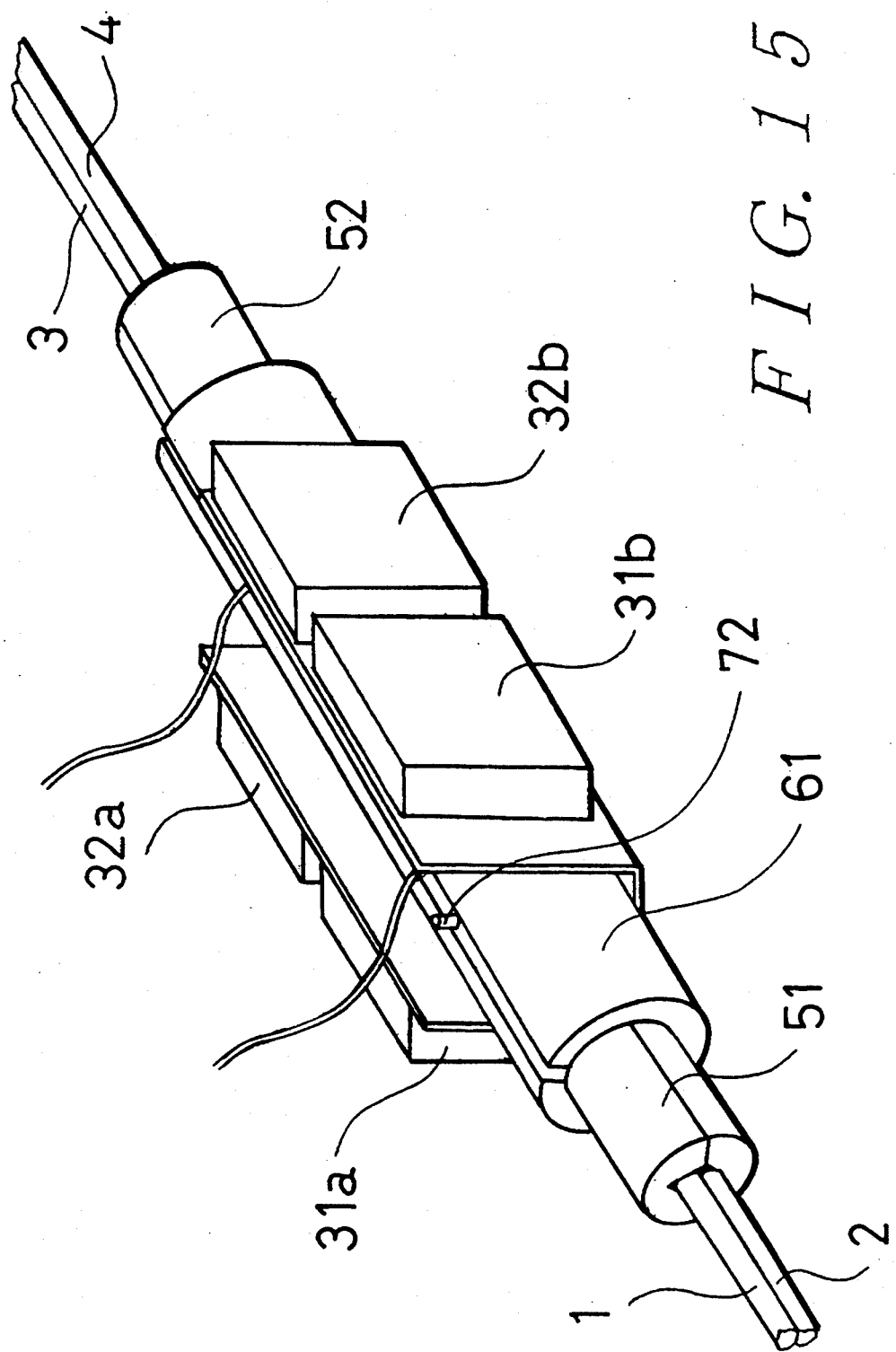
FIG. 15 is a perspective appearance view showing the second embodiment of the 2×2 optical switch of the present invention.

FIG. 13, 14 and 15 show the second embodiment of the present invention.

The second embodiment is composed of the following elements: a supporting member 51 to which base portions of a first and a second optical fiber 1 and 2 are fixed in a cantilever form, magnetic bodies 11 and 12 adhered to the optical fibers 1 and 2 respectively; hollow solenoid coils 21 and 22 for inverting magnetic poles at both ends of the magnetic bodies 11 and 12; two pairs of permanent magnets 31a and 31b, and 32a and 32b giving magnetic attraction to the magnetic bodies 11 and 12; and a cylindrical sleeve 61 for aligning and maintaining an alignment member 52 that fixes a third and a fourth fiber 3 and 4 to a square hole 53 in the center thereof, and fixing these elements together. The two movable optical fibers, that is the first and the second optical fiber 1 and 2, the magnetic bodies 11 and 12, the two fixed optical fibers, that is, the third and the fourth optical fiber 3 and 4, the supporting member 51, the alignment member 52 and a core material 71 have the same structure and are aligned in the same way as those of the 2×2 optical switch the first embodiment.

Desired magnetic bodies 11 and 12 are adhered in a vicinity of tips of the first and the second optical fiber 1 and 2 respectively, and are aligned in displaced positions so that one of them is not on top of the other in a lengthwise directions of the optical fibers 1 and 2 respectively. That is, the magnetic body 11 is within a magnetic field of the pair of the permanent 31a and 31b, and the magnetic body 12 is within a magnetic field of the other pair of the permanent magnets 32a and 32b.

The hollow solenoid coils 21 and 22 are wound in a same direction, are composed of one continuous line, and are aligned so as to surround both the magnetic bodies 11 and 12. Due to such a structure, the magnetic bodies 11 and 12 are magnetized in a same direction.

The pairs of permanent magnets 31a and 31b, and 32a and 32b are aligned so that magnetic polarities of both pairs are approximately in parallel with the optical fibers 1 and 2; so that magnetic lines of force generated between the permanent magnets 31a and 31b, and 32a and 32b respectively are approximately in parallel with a plane including portions of the third and the fourth optical fiber 3 and 4 that are fixed to the alignment member 52; and so that the permanent magnets 31a and 31b are opposite to each other and the permanent magnets 32a and 32b are opposite to each other while oppositely aligned poles have opposite polarities respectively. Further, the permanent magnets 31a and 32a have the opposite magnetic directions and the permanent magnets 31b and 32b have the opposite magnetic directions.

Next, operation of the switch will be explained.

The two adjacent pairs of permanent magnets 31a and 31b, and 32a and 32b are aligned so that the permanent magnets 31a and 31b have the opposite magnetic directions to that of the permanent magnetic 32a and 32b respectively. In this state, if a driving current flows to the hollow solenoid coils 21 and 22, the two magnetic bodies 11 and 12 are magnetized in a same direction. For instance, the first optical fiber 1 is attracted toward the permanent magnet 31a while the second optical fiber 2 is attracted toward the permanent magnet 31b. In such a manner, the pair of movable optical fibers 1 and 2 usually move to opposite directions to each other. The first and the second optical fiber 1 and 2 which are attracted by the permanent magnets in opposite directions to each other are pressed against an interior surface of the square hole 53 provided in the aligning material 52, are stable along the interior angles of the square hole 53, and are oppositely connected with either of the third and the fourth optical fiber 3 and 4 respectively with a predetermined gap provided. Further, if directions of driving currents flowing through the hollow solenoid coils 21 and 22 are changed respectively, directions of magnetic fields generated from the hollow solenoid coils 21 and 22 invert respectively and the magnetic bodies 11 and 12 are magnetized in opposite directions respectively, whose polarities invert respectively. Due to the above, the first and the second optical fiber 1 and 2 are attracted toward the permanent magnets on opposite sides respectively and, each of the optical fibers 1 and 2 is connected with one of the third and the fourth optical fiber 3 and 4 which has not been connected with it. In this embodiment, either of two separate coils or one continuous coil can be used as the hollow solenoid coils 21 and 22.

Further, this embodiment is also a latching type switch in which a driving current flows through the hollow solenoid coils 21 and 22 only when an optical path is switched as well as in the first embodiment of the 2×2 optical switch.

Figure 16:
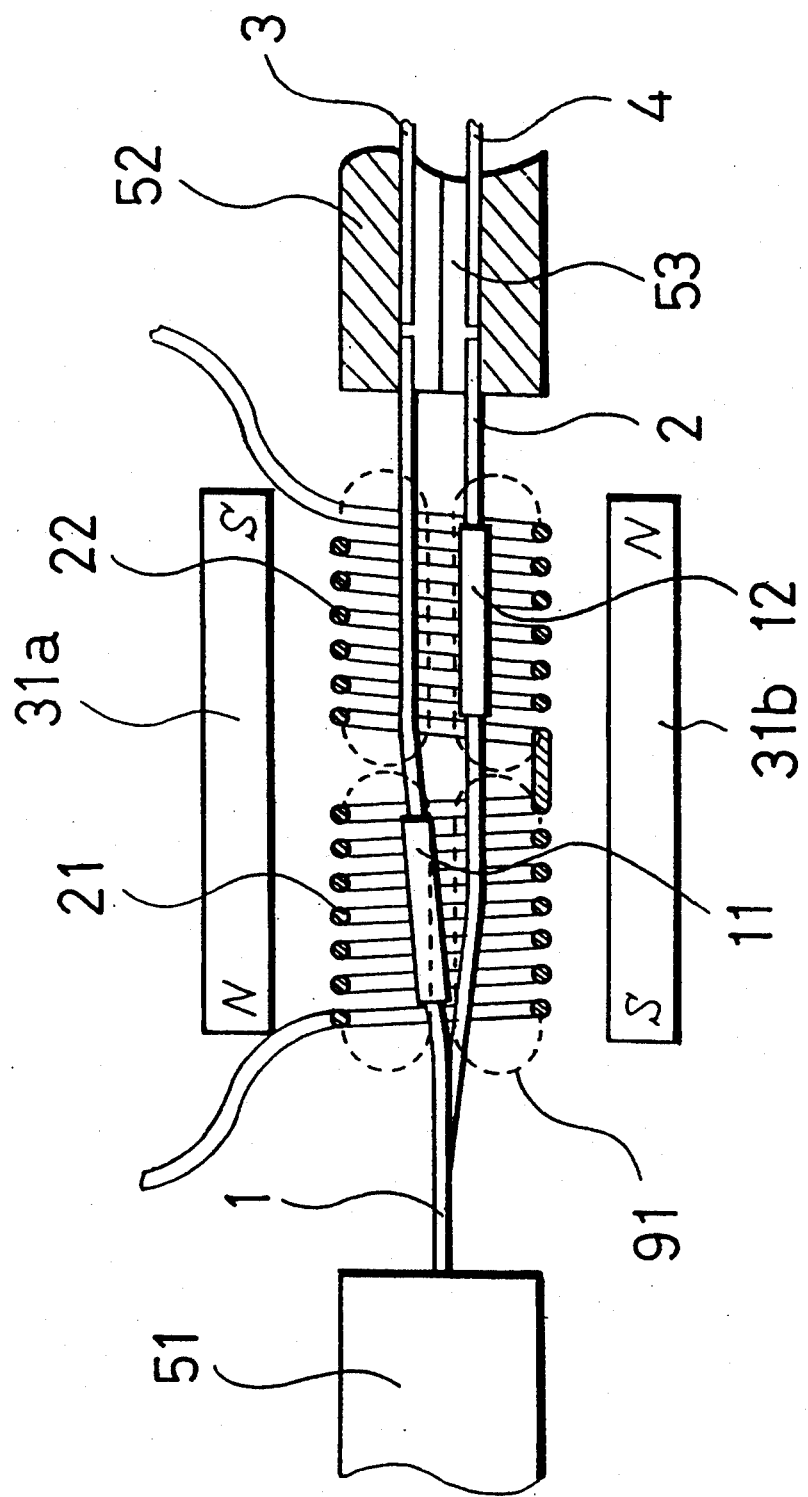
FIG. 16 is an explanatory view showing alignment and function of main elements in the third example of typical structures of the inventive 2×2 optical switch.
Figure 17:
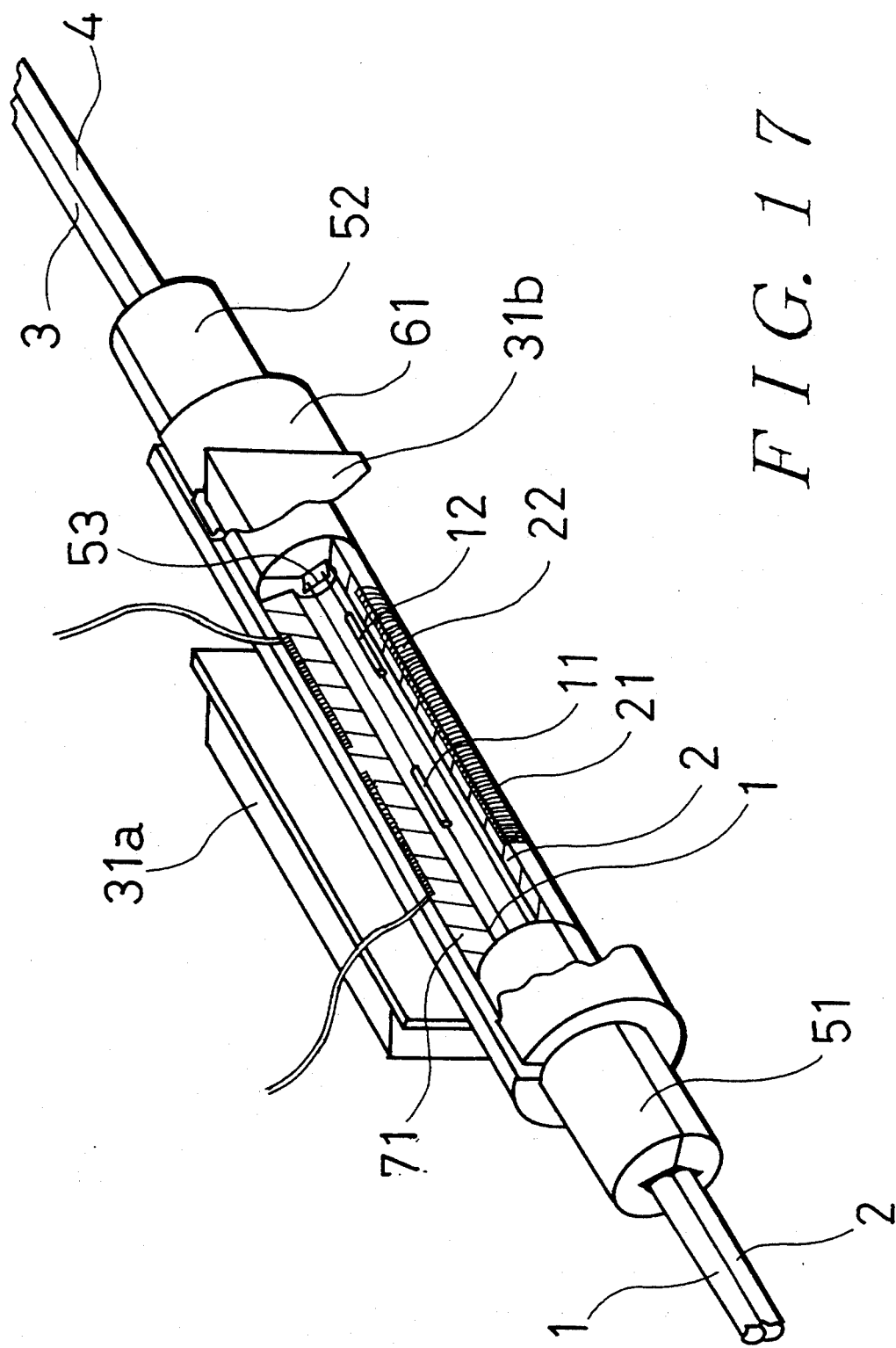
FIG. 17 is a perspective sectional view showing the third embodiment of the inventive 2×2 optical switch.
Figure 18:
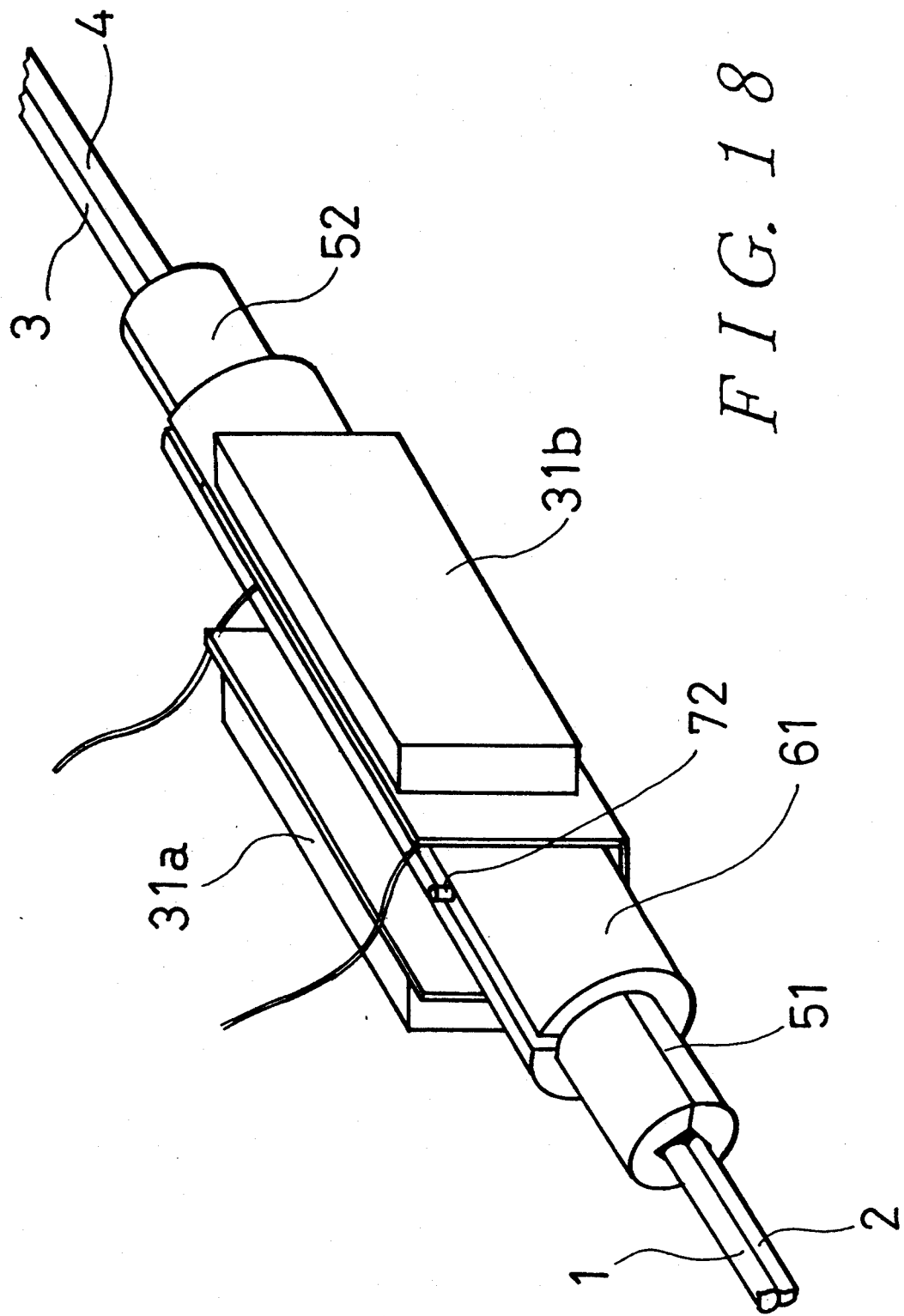
FIG. 18 is a perspective appearance view showing the third embodiment of the inventive 2×2 optical switch.

FIGS. 16, 17 and 18 show a third embodiment of the 2×2 optical switch of the present invention.

The third embodiment is composed of the following elements: a supporting member 51 to which base portions of a first and a second optical fiber 1 and 2 are fixed in a cantilever form, a magnetic bodies 11 and 12 adhered to the first and the second optical fiber 1 and 2 respectively; hollow solenoid coils 21 and 22 for inverting magnetic poles of both terminals of the magnetic bodies 11 and 12 respectively; a pair of permanent magnets 31a and 31b for applying magnetic attraction to the magnetic bodies 11 and 12; and a cylindrical sleeve 61 for aligning and holding alignment member 52 that fixes the third and the fourth optical fiber 3 and 4 in a square hole 53 in the center thereof, and for fixing these elements. The two movable optical fibers, that is, the first and the second optical fiber 1 and 2; the magnetic bodies 11 and 12; the two fixed fiber 3 and 4; the supporting member 51; the alignment member 52; and the core material 71 have the same structure and are aligned in the same way as those disclosed in the first embodiment of the 2×2 optical switch.

The magnetic bodies 11 and 12 that are adhered in the vicinity of tips of the optical fibers 1 and 2 respectively are in such positions as they are surrounded by the hollow solenoid coils 21 and 22 respectively, and both the magnetic bodies 11 and 1 are within magnetic fields of the pairs of permanent magnets 31a and 31b.

Further, the hollow solenoid coils 21 and 22 are wound in opposite directions which are inverted at the middle of the two coils, and are made of one continuous line. In other words, when a driving current flows through the hollow solenoid coils 21 and 22, the magnetic bodies 11 and 12 are magnetized in opposite directions to each other.

The pair of permanent magnets 31a and 31b are oppositely aligned so that their magnet poles are approximately in parallel with the optical fibers 1 and 2 respectively; so that magnetic lines of force generated between the permanent magnets 31a and 31b are approximately in parallel with a plane including portions of the third and the fourth optical fiber 3 and 4 fixed to the alignment member 52, and the oppositely aligned poles have opposite polarities to each other.

Next, operation of the switch will be explained.

The pair of permanent magnets 31a and 31b are aligned so as to have opposite polarities to each other. When a driving current flows through the hollow solenoid coils 21 and 22, the two magnetic bodies 11 and 12 are magnetized in opposite directions to each other. For instance, the first optical fiber 1 is attracted toward the permanent magnet 31a and the second optical fiber 2 is attracted toward the permanent magnet 31b. In such a manner, the pair of movable optical fibers 1 and 2 always move in opposite directions to each other. The first and the second optical fiber 1 and 2 attracted by the permanent magnets of opposite directions to each other are pressed against an interior surface of the square hole 53 of the alignment member 52 and become stable at an interior angle of the square hole 53, and further each of the fibers 1 and 2 is oppositely connected with either of the third or the fourth optical fiber 3 or 4 with a predetermined gap provided. Moreover, when a direction of the driving current that flows through the hollow solenoid coils 21 and 22 is changed, a direction of the magnetic field generated from the hollow solenoid coils 21 and 22 is inverted; then the magnetic bodies 11 and 12 are magnetized in directions opposite to the previous ones respectively and their polarities are inverted. Then, each of the first and the second optical fiber 1 and 2 is attracted by the other permanent magnet than the previous one, and each of them is connected to one of the third and the fourth optical fiber 3 and 4 that has not been connected with it. The pair of permanent magnets 31a and 31b can be either two pairs of permanent magnets that separately attract the magnetic bodies 11 and 12 or of course a pair of permanent magnets that attract totally the magnetic bodies 11 and 12 as mentioned above.

This embodiment is also a latching type switch in which a driving current flows through the hollow solenoid coils 21 and 22 only when an optical path is switched as well as the first embodiment of the 2×2 optical switch.

Since the present invention is structured as explained above, loss can be decreased compared with the conventional switch in which a plurality of 1×2 optical switches that are connected are switched. Therefore, the present invention can realize a compact 1×N optical switch and a compact 2×2 optical switch with a little loss by using a single-element structure respectively.

What is claimed is:

1. A 1×N mechanical optical switch comprising:
   a movable optical fiber extending through a cylindrical tube and being fixed in a cantilever form at an end of the cylindrical tube, a plurality of magnetic bodies being fixed to said movable optical fiber in order in the optical axis line;
   at least one solenoid provided so as to surround said magnetic bodies;
   at least two pairs of permanent magnets oppositely arranged in parallel with each other so as to sandwich each of said magnetic bodies and said solenoid coil therebetween;
   a plurality of fixed optical fibers fixed in a columnar member so as to be opposed to the tip of said movable optical fiber with a predetermined gap; and
   a cylindrical sleeve containing said movable optical fiber, said solenoid coil, and said optical fibers;
   wherein said fixed optical fibers are aligned at equivalent angles in the inside surface of said columnar member, and said permanent magnets are aligned at equivalent angles so as to allow said movable optical fiber face to one of said fixed optical fibers.

2. A 2×2 mechanical optical switch having a first pair of input/output ports into or from a first and a second optical fibers and a second pair of input/output ports into or from a third and a fourth optical fibers, said first and second pairs of input/output ports are oppositely provided and said first optical fiber being coupled to one of said third and fourth optical fibers, and second optical fiber being coupled to one of said third and fourth optical fibers that is not coupled to said first optical fiber comprising:
   an alignment member having a square hole bored therein, for fixing each of said third and fourth optical fibers on an opposite corner of said square hole respectively along the axis direction of said square hole and for aligning oppositely a pair of tips of said first and second optical fibers to that of said third and fourth optical fibers with a predetermined gap provided;
   a supporting member for fixing thereto base portions of said first and second optical fibers in a cantilever form, aligned so that a plane including said first and second optical fibers and a plane including said third and fourth optical fibers are vertical to each other;
   a first magnetic body fixed in a vicinity of the tip of said first optical fiber;
   a second magnetic body fixed in such a position that the second magnetic body is not overlapped lengthwise with the first magnetic body, in a vicinity of the tip of the second optical fiber;
   a first hollow solenoid coil arranged so as to surround the first magnetic body;
   a second hollow solenoid coil arranged so as to surround the second magnetic body;
   a first pair of permanent magnets oppositely arranged to each other and having opposite polarities to each other so that said first magnetic body and said first hollow solenoid coil are sandwiched therebetween, so that a direction of a magnetic pole of said magnets is approximately in parallel with said first and second optical fibers, and so that magnetic lines of force generated between said first pair of permanent magnets are approximately in parallel with a plane including the third and the fourth optical fibers; and
   a second pair of permanent magnets oppositely provided with opposite polarities faced to each other, said second magnetic body and said second hollow solenoid coil being sandwiched therebetween, a direction of a magnetic pole being approximately in parallel with a plane including said third and fourth optical fibers.

3. The 2×2 mechanical optical switch according to claim 2, wherein the first hollow solenoid coil and the second hollow solenoid are wound in a same direction, are made of one continuous line, and the first and the second pairs of permanent magnets are provided so that those pairs of permanent magnets have opposite polarities to each other.

4. The 2×2 mechanical optical switch according to claim 2, wherein the first hollow solenoid coil and the second hollow solenoid coil are wound in opposite directions which are inverted at a middle of the two coils, are made of a continuous line, and the first pair of permanent magnets and the second pair of permanent magnets are provided so that those pairs of permanent magnets have a same polarity.

* * * * *